United States Patent
Patel et al.

(10) Patent No.: US 9,930,418 B2
(45) Date of Patent: *Mar. 27, 2018

(54) TECHNIQUE FOR DELIVERING NETWORK PERSONAL VIDEO RECORDER SERVICE AND BROADCAST PROGRAMMING SERVICE OVER A COMMUNICATIONS NETWORK

(71) Applicant: Time Warner Cable Enterprises LLC, New York, NY (US)

(72) Inventors: Vipul B. Patel, Uppper Holland, PA (US); John W. Callahan, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,687

(22) Filed: Jul. 14, 2016

(65) Prior Publication Data

US 2016/0323649 A1 Nov. 3, 2016

Related U.S. Application Data

(63) Continuation of application No. 12/924,724, filed on Oct. 4, 2010, now Pat. No. 9,398,323, which is a
(Continued)

(51) Int. Cl.
*H04N 21/482* (2011.01)
*G06F 3/0482* (2013.01)
(Continued)

(52) U.S. Cl.
CPC ....... *H04N 21/4821* (2013.01); *G06F 3/0482* (2013.01); *H04N 5/44543* (2013.01);
(Continued)

(58) Field of Classification Search
CPC .................. H04N 21/4438; H04N 21/482
See application file for complete search history.

(56) References Cited

U.S. PATENT DOCUMENTS 5,172,413 A   12/1992   Bradley et al.
5,671,377 A   9/1997    Bleidt et al.
(Continued)

FOREIGN PATENT DOCUMENTS

WO     WO 00/54506      9/2000

*Primary Examiner* — Brian T Pendleton
*Assistant Examiner* — Alexander Q Huerta
(74) *Attorney, Agent, or Firm* — Cozen O'Connor

(57) ABSTRACT

A resident application and a second application are provided in a set-top terminal to receive a TV broadcast service and network personal video recorder (NPVR) service, respectively. The resident application is suspended in favor of the second application when a user changes from a broadcast channel to an NPVR enabled channel, and vice versa. In an embodiment where a digital video recorder (DVR) set-top terminal is used, a DVR server therein provides trick mode functions (pause, rewind and fast-forward) before an NPVR session, e.g., a Look Back session, is established. In another embodiment, during an NPVR session the DVR server plays back recorded programming content downloaded from a communications network, and provides trick mode functions as well.

31 Claims, 15 Drawing Sheets

Related U.S. Application Data continuation of application No. 10/643,111, filed on Aug. 18, 2003, now Pat. No. 7,810,121, which is a continuation-in-part of application No. 10/302,550, filed on Nov. 22, 2002, now Pat. No. 7,073,189.

(60) Provisional application No. 60/377,963, filed on May 3, 2002.

(51) Int. Cl.

| | | |
|---|---|---|
| *H04N 5/445* | (2011.01) | |
| *H04N 5/782* | (2006.01) | |
| *H04N 7/173* | (2011.01) | |
| *H04N 21/231* | (2011.01) | |
| *H04N 21/235* | (2011.01) | |
| *H04N 21/236* | (2011.01) | |
| *H04N 21/24* | (2011.01) | |
| *H04N 21/242* | (2011.01) | |
| *H04N 21/262* | (2011.01) | |
| *H04N 21/2747* | (2011.01) | |
| *H04N 21/4147* | (2011.01) | |
| *H04N 21/4227* | (2011.01) | |
| *H04N 21/432* | (2011.01) | |
| *H04N 21/433* | (2011.01) | |
| *H04N 21/4335* | (2011.01) | |
| *H04N 21/435* | (2011.01) | |
| *H04N 21/45* | (2011.01) | |
| *H04N 21/454* | (2011.01) | |
| *H04N 21/458* | (2011.01) | |
| *H04N 21/472* | (2011.01) | |
| *H04N 21/4722* | (2011.01) | |
| *H04N 21/6587* | (2011.01) | |
| *H04N 21/8545* | (2011.01) | |
| *H04H 60/46* | (2008.01) | |
| *H04H 60/74* | (2008.01) | |
| *H04N 5/44* | (2011.01) | |
| *H04N 5/45* | (2011.01) | |
| *H04N 5/60* | (2006.01) | |
| *H04N 21/422* | (2011.01) | |
| *H04N 21/431* | (2011.01) | |
| *H04N 21/47* | (2011.01) | |
| *H04N 21/478* | (2011.01) | |

(52) U.S. Cl.
CPC ......... *H04N 5/782* (2013.01); *H04N 7/17318* (2013.01); *H04N 7/17327* (2013.01); *H04N 7/17336* (2013.01); *H04N 21/235* (2013.01); *H04N 21/23106* (2013.01); *H04N 21/23614* (2013.01); *H04N 21/242* (2013.01); *H04N 21/2408* (2013.01); *H04N 21/2625* (2013.01); *H04N 21/26291* (2013.01); *H04N 21/2747* (2013.01); *H04N 21/4147* (2013.01); *H04N 21/4227* (2013.01); *H04N 21/435* (2013.01); *H04N 21/4325* (2013.01); *H04N 21/4331* (2013.01); *H04N 21/4333* (2013.01); *H04N 21/4334* (2013.01); *H04N 21/4335* (2013.01); *H04N 21/454* (2013.01); *H04N 21/4532* (2013.01); *H04N 21/4583* (2013.01); *H04N 21/4722* (2013.01); *H04N 21/47214* (2013.01); *H04N 21/482* (2013.01); *H04N 21/6587* (2013.01); *H04N 21/8545* (2013.01); *H04H 60/46* (2013.01); *H04H 60/74* (2013.01); *H04N 5/4401* (2013.01); *H04N 5/45* (2013.01); *H04N 5/602* (2013.01); *H04N 21/42204* (2013.01); *H04N 21/4316* (2013.01); *H04N 21/47* (2013.01); *H04N 21/478* (2013.01); *H04N 2005/4441* (2013.01)

(56) References Cited

U.S. PATENT DOCUMENTS

| | | | |
|---|---|---|---|
| 5,768,539 A | 6/1998 | Metz et al. | |
| 5,793,410 A | 8/1998 | Rao | |
| 6,282,561 B1* | 8/2001 | Jones | G06F 9/5011 718/104 |
| 6,665,869 B1* | 12/2003 | Ellis | H04N 5/4401 348/E5.103 |
| 6,820,265 B1* | 11/2004 | Stamper | A63F 13/10 463/43 |
| 7,028,329 B1 | 4/2006 | Mizutani | |
| 7,073,189 B2 | 7/2006 | McElhatten et al. | |
| 7,380,029 B2 | 5/2008 | Plourde, Jr. | |
| 7,409,140 B2 | 8/2008 | Rodriguez et al. | |
| 7,810,121 B2 | 10/2010 | Patel et al. | |
| 8,539,503 B2 | 9/2013 | Homma | |
| 8,843,963 B2* | 9/2014 | Boylan, III | G06F 3/0482 725/40 |
| 2002/0013948 A1 | 1/2002 | Aguayo, Jr. et al. | |
| 2002/0078449 A1* | 6/2002 | Gordon | H04N 5/44543 725/41 |
| 2002/0174438 A1* | 11/2002 | Cleary | G11B 27/005 725/100 |
| 2002/0178447 A1 | 11/2002 | Plotnick et al. | |
| 2004/0190690 A1* | 9/2004 | Borman | H04M 3/487 379/88.13 |
| 2004/0226042 A1 | 11/2004 | Ellis | |
| 2004/0226044 A1 | 11/2004 | Goode | |
| 2004/0255336 A1 | 12/2004 | Logan et al. | |
| 2005/0015355 A1 | 1/2005 | Heller et al. | |
| 2005/0044577 A1* | 2/2005 | Jerding | H04N 5/44543 725/135 |
| 2005/0283800 A1* | 12/2005 | Ellis | H04N 5/44543 725/40 |
| 2007/0199030 A1* | 8/2007 | Ellis | H04N 5/44543 725/87 |
| 2015/0201235 A1 | 7/2015 | Ellis et al. | |

* cited by examiner

300

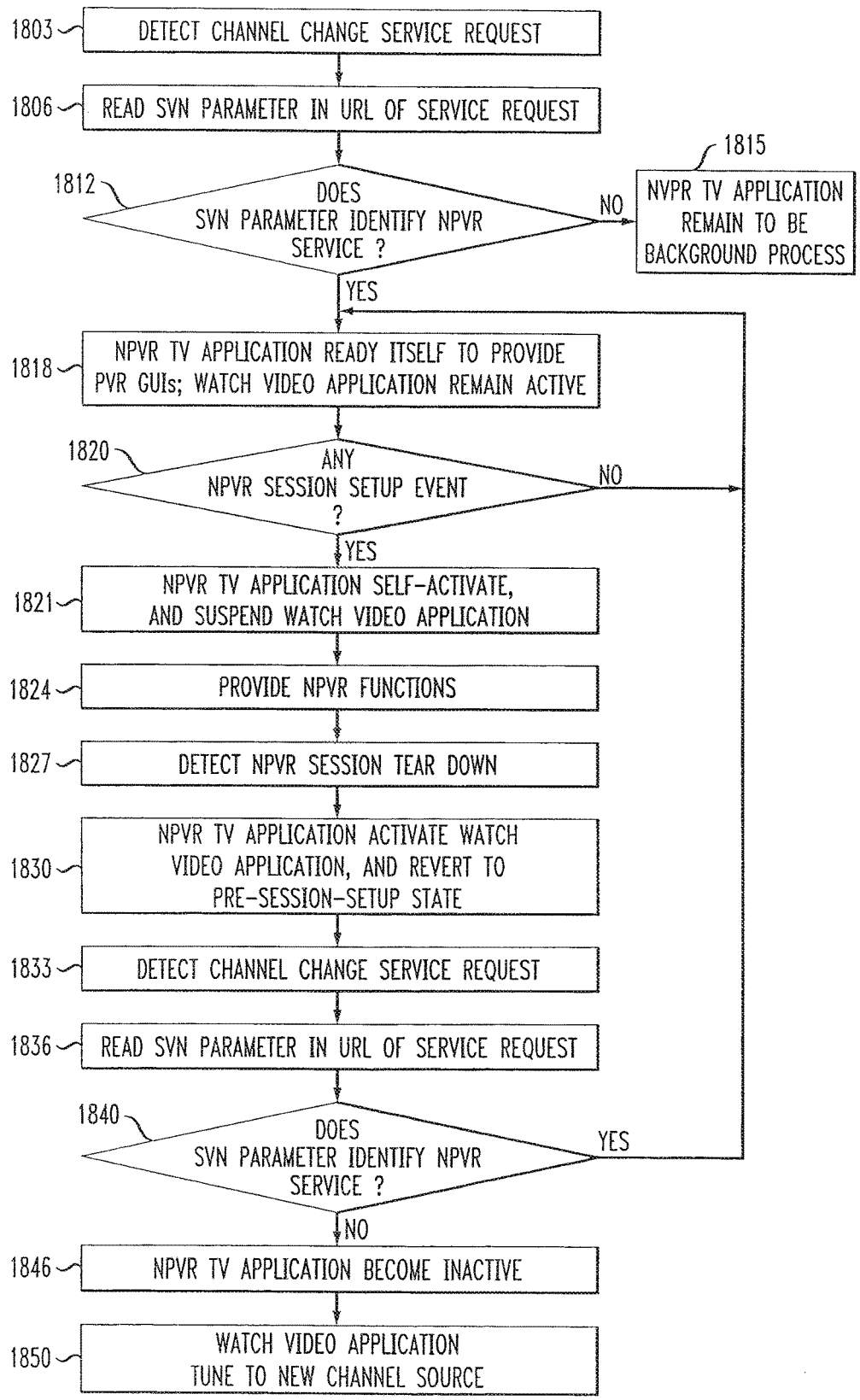

TECHNIQUE FOR DELIVERING NETWORK PERSONAL VIDEO RECORDER SERVICE AND BROADCAST PROGRAMMING SERVICE OVER A COMMUNICATIONS NETWORK

RELATED APPLICATIONS

The present application is a continuation of U.S. patent application Ser. No. 12/924,724, which was filed on Oct. 4, 2010 and will issue on Jul. 19, 2016 bearing U.S. Pat. No. 9,398,323, which is a continuation of U.S. patent application Ser. No. 10/643,111, filed on Aug. 18, 2003, which issued on Oct. 5, 2010 bearing U.S. Pat. No. 7,810,121, which is a continuation-in-part of U.S. patent application Ser. No. 10/302,550, filed on Nov. 22, 2002, which issued on Jul. 4, 2006 bearing U.S. Pat. No. 7,073,189 B2, which claims the benefit of Provisional Patent Application No. 60/377,963 filed on May 3, 2002, which are assigned to the assignee of the present invention and are incorporated by reference herein.

FIELD OF THE INVENTION

The invention relates to communications systems and methods, and more particularly to a system and method for delivering entertainment programs through a communications network, e.g., a cable TV network.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, multiplexed in a transport stream traversing a single transmission channel. A digital TV receiver may be used to decode an MPEG-2 encoded transport stream, and extract the desired program therefrom.
MPEG-2 Background In accordance with the MPEG-2 standard, video data may be compressed based on a sequence of groups of pictures (GOPs), made up of three types of picture frames—intra-coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame.

A B-frame compares both the preceding and subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Use of digital video recorders (DVRs), also known as personal video recorders (PVRs), such as TiVo and ReplayTV devices, is ubiquitous, which provide conveniences to TV viewers. For example, a prior art DVR allows a user to record his/her favorite TV programs for later review, and exercise a season-pass-like option to record every episode of his/her favorite program for a period. It may automatically record programs for the user based on his/her viewing habit and preferences. The presentation of the recorded programming content can be manipulated by exercising rewind, pause and fast-forward functions (hereinafter referred to as "trick mode" functions) furnished by the DVR. In addition, some prior art DVRs provide a "commercial skip" feature or the like, enabling the user to conveniently skip commercials when viewing recorded programming content.

A prior art DVR also automatically records the last X minutes of programming content played on the channel to which the user actually tunes, where X represents a predetermined value. Thus, if a DVR user is watching an in-progress (or live) broadcast program, the user may rewind the recorded portion of the program to a certain point that has already been broadcast or may pause for subsequent playing, rewinding and/or fast-forwarding.

Recently, some set-top terminals for cable TV were improved to incorporate the above-described DVR functions ("DVR set-top terminals"). For example, like a DVR, a DVR set-top terminal typically includes a hard drive, e.g., a disk, for digitally recording TV programs, in accordance with the DVR functions.

In addition, the cable TV industry has been fervently pursuing a "network PVR (NPVR)" service allowing the user to perform the analogous DVR functions through use of a network, rather than a local DVR device (e.g., a prior art DVR or DVR set-top terminal) at the user premises. In fact, a network architecture and functionalities for implementing the NPVR service have been developed and are described, for example, in copending commonly assigned application Ser. No. 10/302,550, filed on Nov. 22, 2002, which issued on Jul. 4, 2006 bearing U.S. Pat. No. 7,073,189 B2, hereby incorporated by reference. For example, unlike a DVR device, the NPVR service allows a user to "reserve" past and future programs for his/her review, even if such reserved programs were not identified by the user before their broadcast.

SUMMARY OF THE INVENTION

In accordance with the invention, a user at a set-top terminal may select a program source afforded a first programming service (e.g., a TV broadcast service) or a second programming service (e.g., the aforementioned NPVR service) to obtain first programming content or second programming content. For example, the first programming content is made available to the set-top terminal according to a broadcast schedule. On the other hand, the second programming content is recorded during the broadcast thereof at a location (e.g., a headend of a cable TV system) remote from the set-top terminal, and a selected portion of the second programming content may be obtained via the set-top terminal from the remote location upon a user's request.

The present invention may be implemented using a set-top terminal with or without DVR capability. In a set-top terminal having no DVR capability, a first application (e.g., a conventional resident Watch TV application) is used to realize the first service (e.g., the TV broadcast service), and a second application (e.g., an NPVR application) is used to realize the second service (e.g., the NPVR service). In a first example where a user, at a set-top terminal having no DVR capability, changes from a first program source afforded the broadcast service to a second program source afforded the NPVR service, the need of the NPVR application is recognized by referring to one or more tables in the set-top terminal which associate the second program source with the NPVR application. Accordingly, the NPVR application is activated in response to the program source change, and the Watch TV application associated with the first program source is suspended.

In a second example where a set-top terminal having no DVR capability is used, the NPVR application monitors for an identifier included in a request for changing from a first program source to a second program source. For instance, the identifier may identify the second program source by a source name (e.g., HBO) which, unlike the first program source afforded a broadcast service, is afforded an NPVR service. Recognizing that the second program source identified by the identifier is afforded the NPVR service, the NPVR application self-activates, and suspends the Watch TV application serving the first program source material.

As mentioned before, the invention may also be implemented using a set-top terminal with DVR capability (conveniently termed "DVR set-top terminal"). The DVR set-top terminal includes a conventional DVR server, and storage for storing selected programming content for playback by the DVR server. The DVR server is capable of performing trick mode functions (e.g., rewind, pause and fast-forward) to manipulate a playback presentation. The DVR set-top terminal includes a resident application (e.g., a conventional Watch Video application) which is used to realize a TV broadcast service and conventional DVR functions. It may also include a second application (e.g., an NPVR application) for realizing the NPVR service.

In an example where a user, at a DVR set-top terminal, changes from a first program source afforded a broadcast service to a second program source afforded an NPVR service, the NPVR application is not activated until an NPVR session is invoked. For example, an NPVR session may entail transmission of recorded programming content from the remote location to the set-top terminal upon a user's request. That is, in this example, even after the change to the second program source but before an NPVR session, the Watch Video application which was active to serve the first program source material and perform any DVR functions remains active. In fact, during such a period, a manipulation of the presentation (e.g., rewind, pause and fast-forward) of the second program source material is performed by the DVR server, in accordance with the Watch Video application.

However, during the NPVR session, a media processor (e.g., in the headend) remote from the DVR set-top terminal presents the requested programming content recorded at the remote location, and performs any trick mode functions to manipulate such a presentation, in accordance with the NPVR application. In an alternative embodiment, during an NPVR session, the requested programming content is downloaded from the remote location to the aforementioned storage in the DVR set-top terminal. The DVR server then presents the downloaded content in the storage and performs any trick mode functions, in accordance with the Watch Video application.

BRIEF DESCRIPTION OF THE DRAWING

Further objects, features and advantages of the invention will become apparent from the following detailed description taken in conjunction with the accompanying drawing showing illustrative embodiments of the invention, in which:

FIG. 18 is a flow chart depicting a third routine for providing broadcast and NPVR services in accordance with the invention;

DETAILED DESCRIPTION

The invention is directed to delivering programming content to users through a broadband communications network, e.g., a cable TV network. In accordance with a feature of the invention, selected program channels may be afforded a network private video recorder (NPVR) service to enhance the user's enjoyment of the programming content associated with such program channels. In accordance with the NPVR service, broadcast programs (or at least those broadcast programs associated with the selected program channels afforded the NPVR service) are recorded at a headend of a cable network before they are delivered to a user at a set-top terminal. Thus, the user may "reserve", for later review, not only in-progress programs and future programs, but also previously broadcast programs since they have been recorded at the headend regardless of any user request. In other words, the NPVR service obviates the need of a proactive effort otherwise required of a typical PVR user, which includes deciding and actively electing in advance what shows to record. For example, a "Look Back" feature is implemented in the NPVR service, which allows a user to go back and access previously broadcast programs up to a predetermined period in the past. In addition, the NPVR service furnishes trick mode functions (e.g., rewind, pause and fast-forward functions) for manipulating a presentation of recorded programming content.

In order to fully appreciate the invention, one needs to learn about the NPVR service, an implementation of which will now be described:

NPVR Service Implementation

Figure 1:
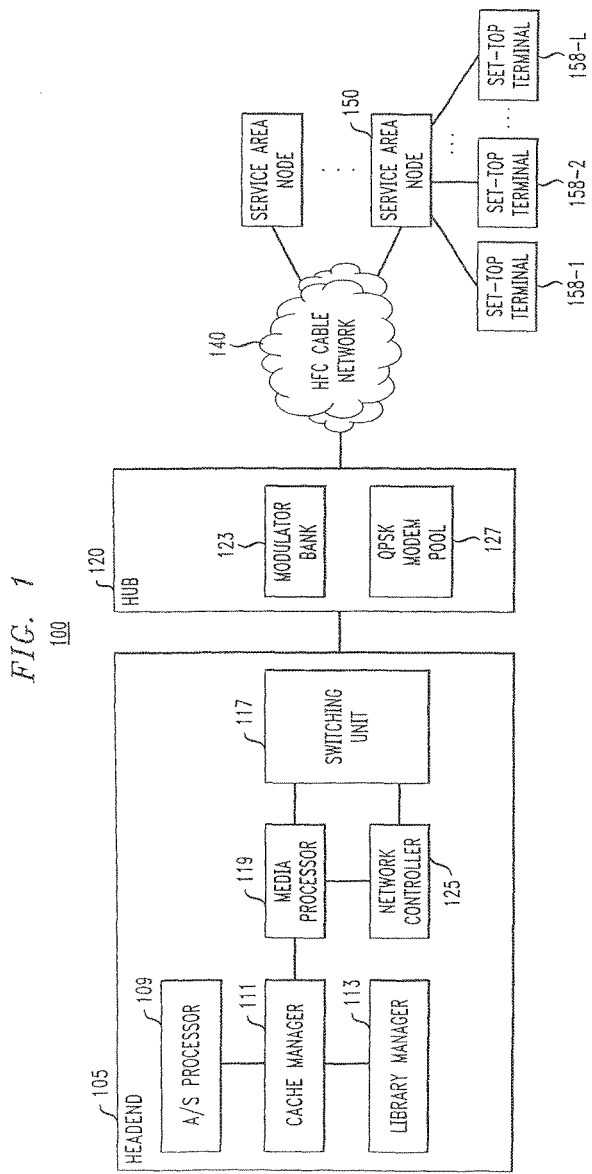
FIG. 1 is a block diagram of a broadband communications system in accordance with the invention.

FIG. 1 illustrates broadband communications system 100 for providing the NPVR service. For example, system 100 in this instance includes a cable system for delivering information and entertainment programs to set-top terminals on the user premises. As shown in FIG. 1, system 100 includes headend 105, hub 120, hybrid fiber coax (HFC) cable network 140 and different service area nodes including node 150, which in this instance is connected to set-top terminals 158-1 through 158-L in a neighborhood, where L represents an integer.

Headend 105 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources.

Acquisition/Staging (A/S) processor 109 in headend 105 processes program materials including, e.g., TV program streams, from one or more of the aforementioned sources in analog and digital forms. Analog TV program streams may be formatted according to the National Television Standards Committee (NTSC) or Phase Alternating Line (PAL) broadcast standard. Digital TV streams may be formatted according to the Digital Video Broadcasting (DVB), Society of Cable Telecommunications Engineers (SCTE), or Advanced Television Systems Committee (ATSC) standards. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams are typically encoded at a variable bit rate (VBR). To avoid data burstiness, processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 23 to view program material provided by HBO; program channel 32 to view program material provided by MTV, etc.

In this illustrative embodiment, the transmission channels, each carrying a transport stream, may be 6 MHz bands populating a forward passband, e.g., 350-750 MHz band, of a coaxial cable, which is allocated for downstream communication from headend 105 to a set-top terminal.

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container for any object or set of objects that may be desired to implement a service, including video, audio, images, application executables, scripts, configuration files, text, fonts, and HTML pages (or pointers referencing their storage locations). In addition to the raw content, metadata is also a part of an asset object that describes characteristics of the asset. For example, asset metadata may describe attributes that are inherent in the content of the asset, such as the rating, format, duration, size, or encoding method. Values for asset metadata are determined at the time the asset is created.

Figure 2:
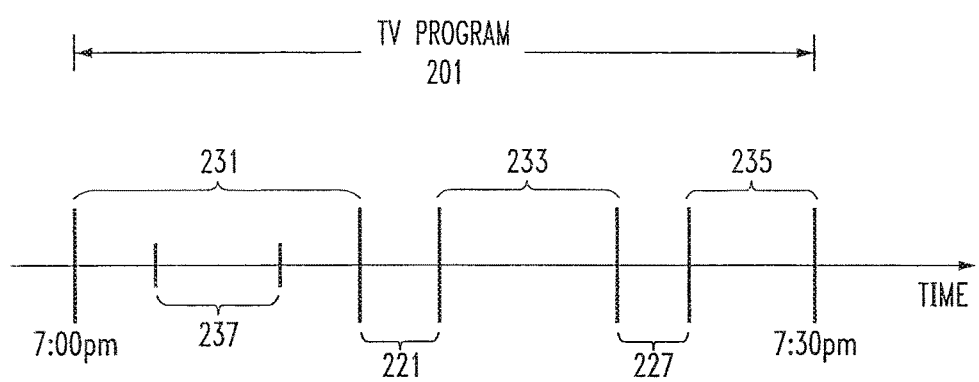
FIG. 2 illustrates a TV program comprising multiple program segments which is provided in the system of FIG. 1.

An asset concerning a program may include trick files associated with the program as well. FIG. 2 illustrates TV program 201 which spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. The TV program streams received by processor 109 are pre-processed, e.g., by the providers, to include indicators, e.g., cue-tones, on which processor 109 relies to identify the demarcations (or edges) of different programs and program segments within each program. Thus, in this instance before processor 109 processes the TV program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201. Another set of cue-tones may be inserted to delimit a "chapter" (denoted 237) within a program. A chapter is a self-contained sub-program, e.g., a skit, monolog, song performance, news report, weather report, etc. within a program. With the cue-tones defining one such chapter, processor 109 is capable of identifying the chapter and create an asset concerning the same.

Let's assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves. Each program when presented to processor 109 is identified by a program designation, which may be used to locate the corresponding program guide data. In particular, processor 109 while processing TV program 201 may locate the corresponding program guide data to create in real time the metadata file associated with TV program 201. The metadata file thus created includes such data as the title, rating (e.g., G, PG-13, R, etc.), names of the producer, director, and actors, duration of the program, program type (e.g., situation comedy), etc.

Processor 109 may also create in real time trick files associated with program 201 as part of the asset which are used to perform trick mode functions (e.g., pausing, rewinding and fast-forwarding) on program 201. One such trick file in this instance is a "fast-forward" trick file which contains an array of identifiers of I-frames in the program stream (MPEG-2 encoded as mentioned before) corresponding to program 201 in a forward direction. Another trick file is a "rewind" trick file which contains an array of identifiers of I-frames in the program stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

It should be noted that where program 201 is not an initial broadcast program, which may also be pre-staged, commercial segments 221 and 227 may not contain the commercials originally provided by the program provider. Rather, program 201 may be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below.

The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Otherwise, a "cache miss" causes locating the requested program in the library storage, thereby incurring a delay in the retrieval of the program.

Network controller 125, among others, assigns resources for transporting program materials to set-top terminals and communicates various data including system information with the terminals. Upstream data from a set-top terminal to network controller 125 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 25 may change after a system reconfiguration. Nevertheless, each set-top terminal and controller 25 is also assigned a media access control (MAC) address on a permanent basis, surviving any system reconfiguration.

Downstream data from network controller 125 to a set-top terminal is communicated via forward data channels (FDCs). These channels, often referred to as "out-of-band" channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

When a user at a set-top terminal, say, terminal 158-1, turns on the TV associated therewith and selects a particular program channel, say, program channel 2, or change from another channel to channel 2, terminal 158-1 in a well known manner scans for any transport streams transporting programs to the neighborhood. In system 100, each transport stream is identified by a unique transport stream identification (TSID).

Figure 3:
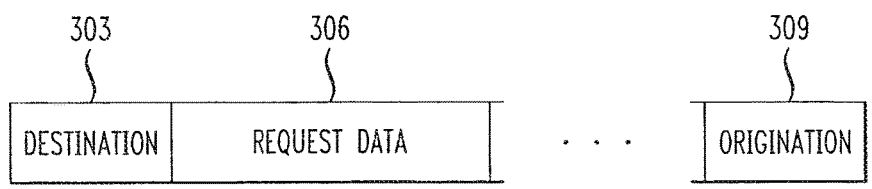
FIG. 3 illustrates a request for program material from a set-top terminal in the system of FIG. 1.

Continuing the above example, once the TSIDs of the transport streams are detected, terminal 158-1 sends through QPSK modem pool 127 a request for program channel 2 material. FIG. 3 illustrates one such request (denoted 300) sent from a set-top terminal to network controller 125 via an RDC. As shown in FIG. 3, request 300 includes, among others, destination field 303 which in this instance contains the IP address of network controller 125 for which request 300 is destined; request data field 306 which contains data concerning the detected TSIDs and the requested program channel material, e.g., program channel 2 material in this instance; and origination field 309 which in this instance contains the IP (and/or MAC) address of terminal 158-1 from which request 300 originates.

Figure 4:
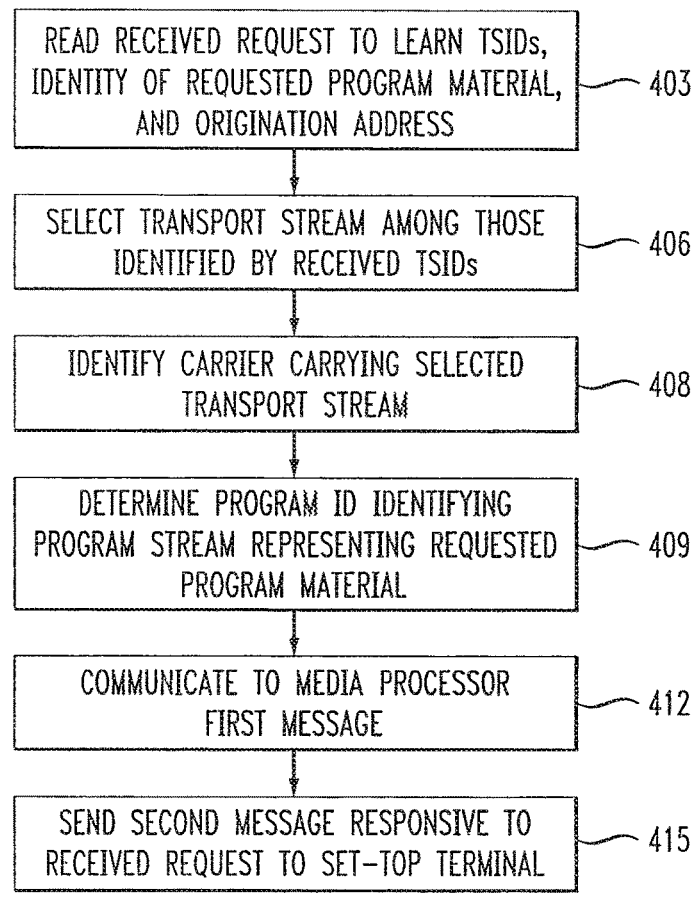
FIG. 4 is a flow chart depicting a process for providing program material in response to the request of FIG. 3.

After receiving request 300, network controller 125 reads the received request to learn the TSIDs, the identity of the requested program material, and the origination address therein, as indicated at step 403 in FIG. 4. Network controller 125 communicates with media processor 119 to determine the capacity required for transmitting the requested program material. Based on the required capacity, controller 125 at step 406 selects a transport stream among those identified by the received TSIDs which is suitable for transporting the requested program material. Controller 125 at step 408 identifies the carrier carrying the selected transport stream.

Figure 5:
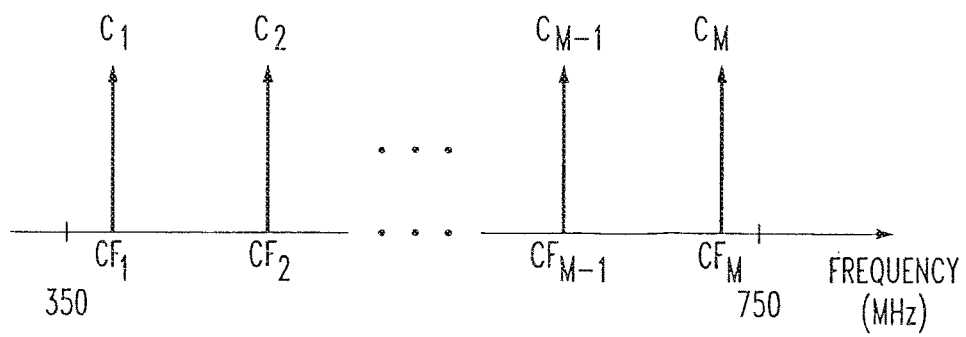
FIG. 5 illustrates selected carriers for transmitting program materials in a forward passband of the system of FIG. 1.

Referring also to FIG. 1, modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 5 illustrates M carriers, $C_1$ through $C_M$, associated with M transmission channels in the forward passband. As shown in FIG. 5, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123 in this instance may modulate 9 or more program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up from the table the carrier associated with the TSID of the selected transport stream. Based on the requested program channel, network controller 125 at step 409 determines the program ID identifying the program stream representing the requested program material, i.e., program channel 2 material in this instance, which is then multiplexed with other program streams in the selected transport stream. At step 412, network controller 125 communicates to media processor 119 a first message containing the identity of the modulator in modulator bank 123 which corresponds to the carrier, say, $C_1$, just determined, and the program ID associated with the requested program channel material just determined. Network controller 125 at step 415 sends, through QPSK modem pool 127, a second message responsive to the received request to set-top terminal 158-1 identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the carrier C, with the received transport stream, and causes transmission of the modulated carrier through the transmission channel associated with $CF_1$.

Based on the information in the second message, terminal 158-1 tunes to the carrier frequency CF, to receive the transmitted transport stream, and extracts therefrom the desired program stream, representing program channel 2 material in this instance. In a well known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

Figure 6:
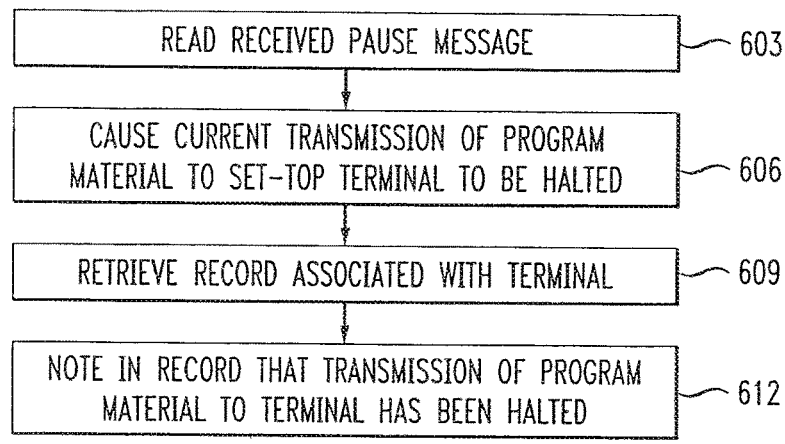
FIG. 6 is a flow chart depicting a process for pausing a program in response to a pause message from a set-top terminal.

When the user issues a pause command to terminal 158-1, e.g., by pressing a "pause" key on a remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. After receiving the pause message, processor 119 reads the received pause message, as indicated at step 603 in FIG. 6. Processor 119 at step 606 causes the current transmission of the program material to set-top terminal 158-1 (identified by the received IP and/or MAC address) to be halted at the I-frame immediately following the last I-frame identified in the received message. Processor 119 at step 609 retrieves the record associated with terminal 158-1. Processor 119 at step 612 notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Figure 7:
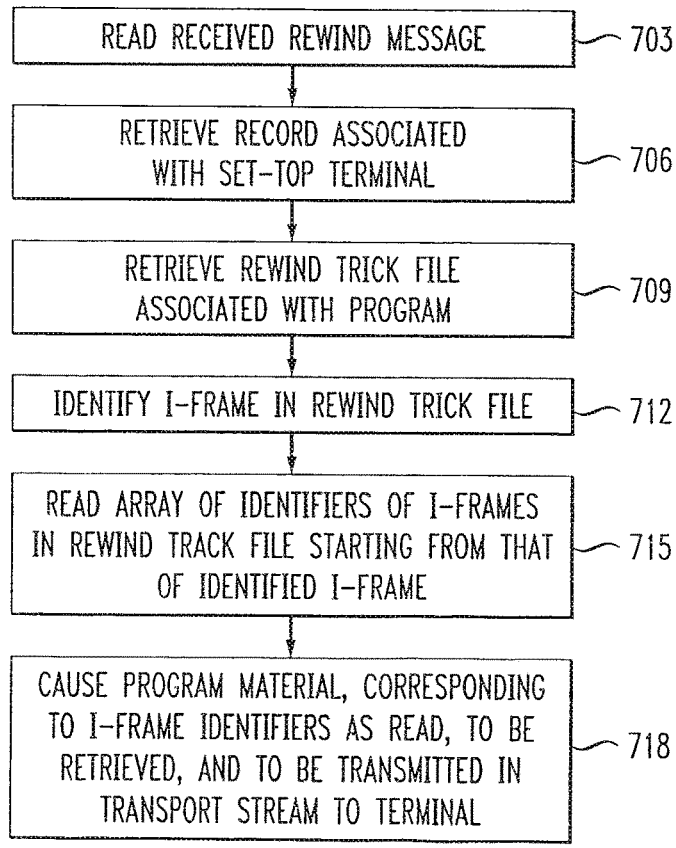
FIG. 7 is a flow chart depicting a process for rewinding a program in response to a rewind message from a set-top terminal.

While viewing a program, the user may issue a rewind command, e.g., by pressing a rewind key on the remote control, to rewind the program. In that case, terminal 158-1 issues a rewind message to processor 119 identified by its IP address. This rewind message includes a rewind initiation command, the last I-frame identifier registered by terminal 158-1, and the IP address (and/or MAC address) identifying terminal 158-1. After receiving such a rewind message, processor 119 reads the received rewind message, as indicated at step 703 in FIG. 7. Processor 119 at step 706 retrieves the record associated with set-top terminal 158-1 identified by the received IP address (and/or MAC address). Knowing from the record the identity of the program being transmitted, processor 119 at step 709 retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame. Processor 119 at step 718 causes the program material, corresponding to the I-frame identifiers as read, to be retrieved from cache manager 111, and to be transmitted in the transport stream to terminal 158-1, thereby achieving the desired rewind effect.

When the user issues a command to stop rewinding the program, e.g., by toggling the rewind key on the remote control, terminal 158-1 sends a rewind termination message to processor 119. This message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Figure 8:
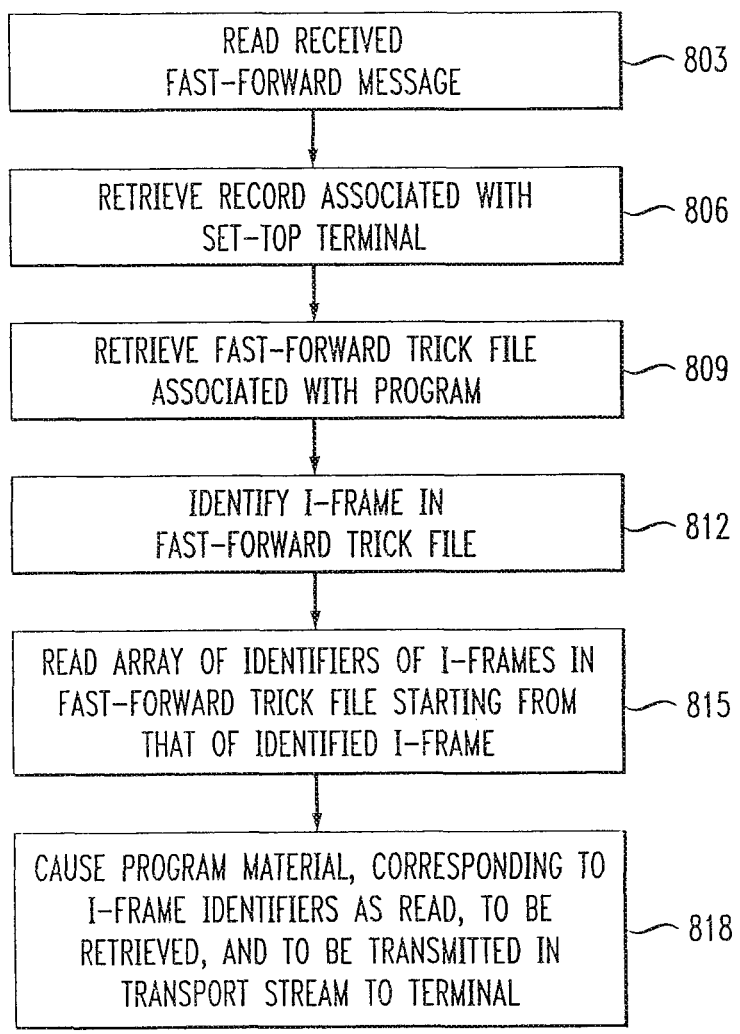
FIG. 8 is a flow chart depicting a process for fast-forwarding a program in response to a fast-forward message from a set-top terminal.

After rewinding a program, the user may issue a fast-forward command, e.g., by pressing a fast-forward key on the remote control, to fast-forward the program. In that case, terminal 158-1 issues a fast-forward message to processor 119 identified by its IP address. This fast-forward message includes a fast-forward initiation command, the last I-frame identifier registered by terminal 158-1, and the IP address (and/or MAC address) identifying terminal 158-1. After receiving such a fast-forward message, processor 119 reads the received fast-forward message, as indicated at step 803 in FIG. 8. Processor 119 at step 806 retrieves the record associated with set-top terminal 158-1 identified by the received IP address (and/or MAC address). Knowing from the record the identity of the program being transmitted, processor 119 at step 809 retrieves from the aforementioned asset storage the fast-forward trick file associated with the program. Based on the last I-frame information in the received message, processor 119 at step 812 identifies the I-frame in the fast-forward trick file which either matches or is the closest to that last I-frame. Processor 119 at step 815 reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in the transport stream to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119. This message includes a fast-forward termination command, and the IP address (and/or MAC address) of terminal 158-1. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

It should be pointed out at this juncture that in the above illustrative embodiment, the transport streams generated by processor 109, which contain, e.g., in-progress (or live) TV broadcast, are recorded in cache manager 111, followed by library manager 113, before they are fed to the requesting set-top terminals. As a result, the transport streams received by the terminals actually are recorded copies of the streams generated by processor 109. However, in another embodiment, the transport streams generated by processor 109 are fed to the requesting set-top terminals in real time, and at the same time switched to cache manager 111 and library manager 113 for recording thereof. Thus, in this other embodiment, when a user at a set-top terminal performs a trick mode function on an in-progress TV broadcast program, say, rewinding the program, the real-time transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program. In that case, the second transport stream being received by the terminal may be replaced back by the real-time transport stream containing the in-progress program.

Program Channel Dependent NPVR Service

In accordance with an aspect of the invention, selected program channels are afforded the above-described NPVR service, and the rest of the program channels are afforded the traditional broadcast service. In this instance, program channel 23 associated with the content source by the service name HBO is one such NPVR enabled channel.

Figure 9:
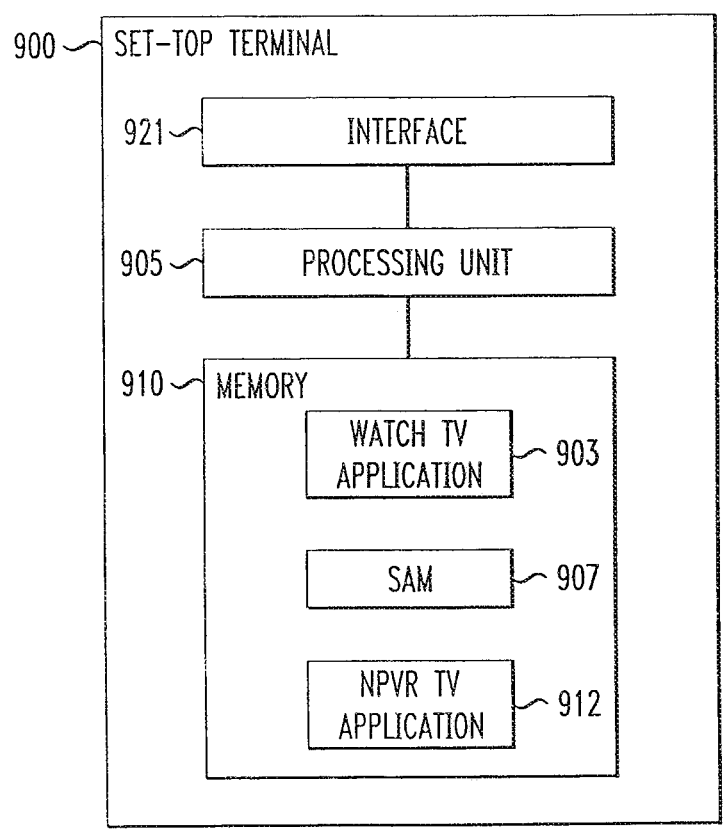
FIG. 9 is a block diagram of a set-top terminal in accordance with the invention.

A conventional "Watch TV" application (denoted 903 in FIG. 9) is installed in a set-top terminal (denoted 900) to service those program channels afforded the traditional broadcast service. It should be noted that set-top terminal 900 here generically represents one of set-top terminals 158-1 through 158-L. Watch TV application 903, residing in memory 910, provides such well known functions as channel navigation control, channel selection in response to a channel change event, etc. A channel change event occurs when a user at set-top terminal 900 issues a command to change from one program channel to another. Such a command may be issued, say, using a remote control (not shown), which signal is receptive by set-top terminal 900. Memory 910 in this instance comprises one or more caches, disks, hard drives, NVRAMs, DRAMs, Flash ROMs, and/or ROMs.

For example, in memory 910, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, AC-3 audio decoding, and video manipulation. ROM may be used for storage of the operating system. Flash ROM may be used for storage of resident application software, as well as patches of the operating system and application software which are downloaded to set-top terminal 900 from headend 105 after set-top terminal 900 has been deployed at the user's premises.

Processing unit 905 orchestrates the operations of set-top terminal 900. It executes instructions stored in memory 910 under the control of the operating system. Service application manager (SAM) 907, forms part of such an operating system of terminal 900. SAM 907 is responsible for, among other things, monitoring channel change events; administering channel, service and other tables in terminal 900; and maintaining a registry of applications in terminal 900. One such application is aforementioned Watch TV application 903. Another application is "NPVR TV" application 912 for servicing NPVR enabled channels, which may be downloaded from headend 105 to memory 910. Application 912, among others, responds to rewind, pause and fast-forward commands initiated by a user, and communicates such commands to headend 105 through interface 921 to realize the trick mode (i.e., rewind, pause and fast-forward) functions in the manner described before. In addition, for example, application 912 not only allows a user to reserve future broadcast programs for review, but also reserve, play or re-start programming content that has broadcast, in accordance with a "Look Back" feature.

Look Back Feature

The Look Back feature enables a user to access programming content that has broadcast during a "Look Back Period"—i.e., up to a predetermined period. The actual length of the period is subject to the negotiated rights to the programming content. Specifically, the Look Back feature enables a user to re-start a program on an NPVR enabled channel that is currently being broadcast. The Look Back feature also enables a user to play a program on an NPVR enabled channel that was previously broadcast within the Look Back Period (e.g., the previous two days). In addition, the Look Back feature enables a user to reserve a program in its entirety that is presently being broadcast or that was previously broadcast on an NPVR enabled channel within the Look Back Period for subsequent viewing or archiving.

Programs that are available through the Look Back feature may be accessed for viewing or reserving in several ways. For example, a Look Back menu may be accessed when viewing content on an NPVR enabled channel which, in effect, gives that channel an on-demand-like feature. Thus, by accessing a Look Back menu, the viewer may be presented with a categorical listing of all programs that are available for either (1) immediate viewing, or (2) reservation for subsequent viewing. Therefore, the Look Back feature provides a user with the ability to play or reserve previously (or currently) broadcast programs, but does not require the user to denote such programs in advance as a favorite, or to otherwise proactively elect to reserve the program.

Figure 10:
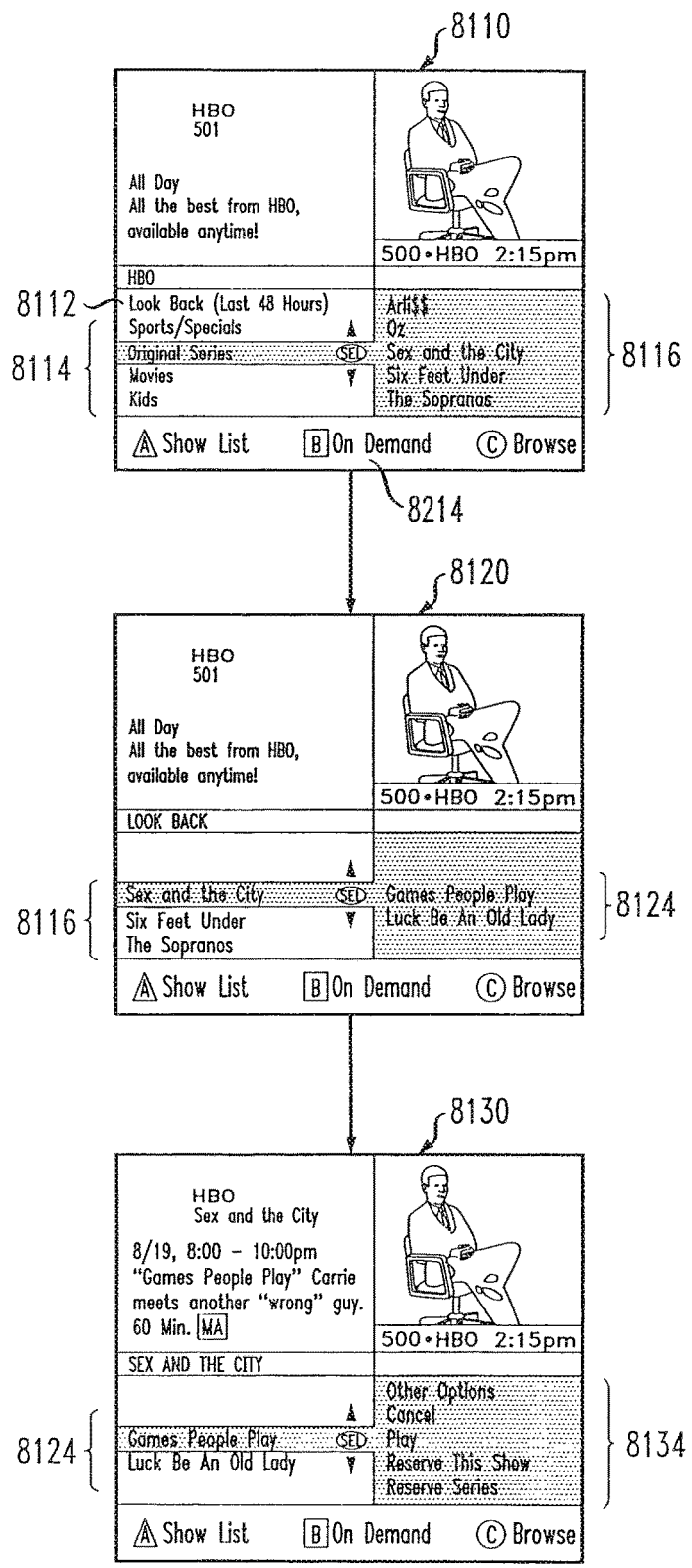
FIG. 10 illustrates screen displays in accessing a Look Back GUI in accordance with a first embodiment.

Programs that are available through the Look Back feature may be accessed by a listing that may be organized by channel, by reverse chronological order (or chronological order), by theme (movies, sports, drama, etc.), by alphabetical order, etc. The Look Back feature may be made available while a user is viewing a program on an NPVR enabled channel. Turning to FIG. 10, while a user is viewing, e.g., a program on the HBO channel (an NPVR enabled channel in this instance), Look Back feature option 8112 is offered on graphical user interface (GUI) 8110 after the user presses, say, a menu key on a remote control. A selection of option 8112 in this instance allows the user to access past programs broadcast on the same channel (i.e., the HBO channel being viewed by the user) within the Look Back Period. Specifically, by highlighting the Look Back feature option 8112 and pressing, say, a select key on the remote control, a list of programming categories, denoted 8114 are displayed under selected Look Back feature option 8112. These categories may include sports programming, specials, original series, movies, kids programming. By highlighting a program category from list 8114, another list of available programs, denoted 8116, is displayed on GUI 8110.

Upon selecting a program category by pressing the select key on the remote control, Look Back Programming GUI 8120 lists programs 8116 that are available on the HBO channel for the program category that was selected. These programs 8116 are listed on the left side of GUI 8120. As the user highlights a listed program, episodes 8124 that are available through the Look Back feature are listed on the right side of GUI 8120.

Upon selecting a program by pressing the select key on the remote control, Look Back Episode GUI 8130 lists episodes 8124 that are available on the HBO channel for the program that was selected. These episodes 8124 are listed on the left side of Look Back GUI 8130. As the user highlights a listed episode, the reservation/play options 8134 that are available through the Look Back feature are listed on the right side of GUI 8130. These features may include, for example, canceling the Look Back feature request, playing the selected episode, reserving the selected episode and reserving the entire series (i.e., season pass).

Figure 11:
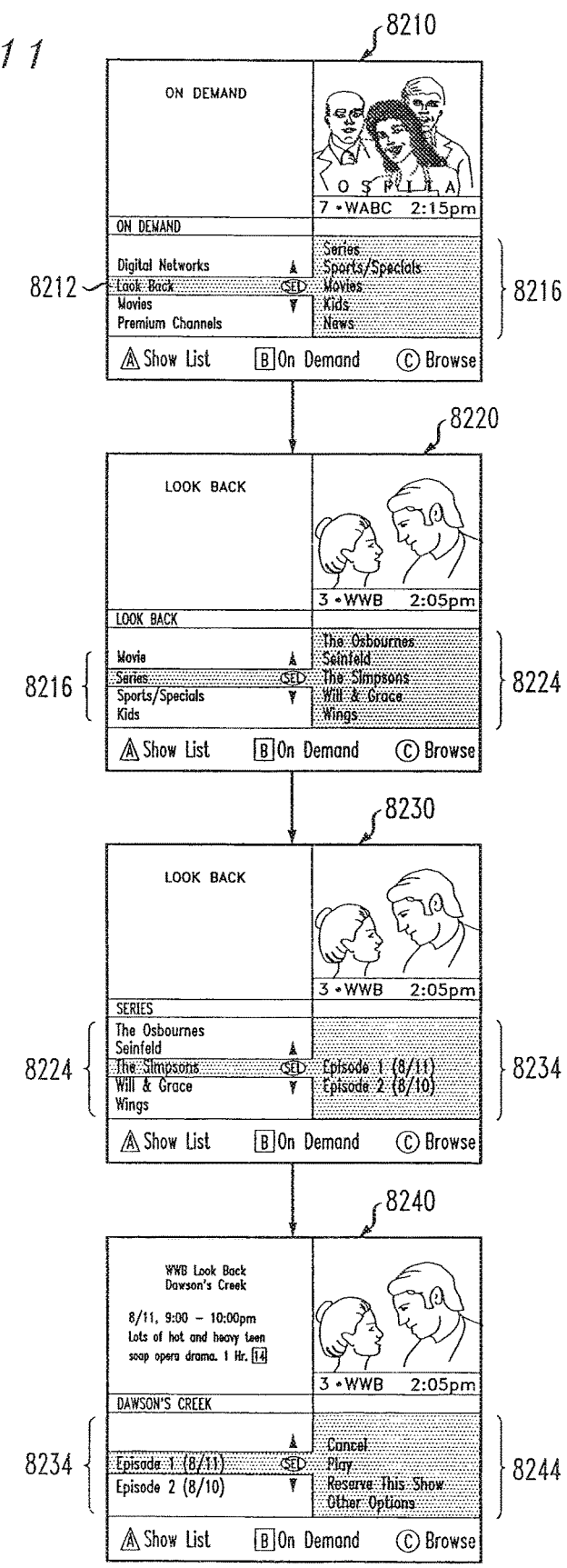
FIG. 11 illustrates screen displays in accessing a Look Back GUI in accordance with a second embodiment.

A Global Look Back feature may also be implemented. The Global Look Back feature enables a user to access a program previously broadcast even if the user does not know on which channel it was broadcast. As illustrated in FIG. 11, the Global Look Back feature displays programs from one or more databases of all NPVR enabled channels providing Look Back-enabled access during a given Look Back period (e.g., two days into the past). For example, Look Back option 8212 is displayed upon accessing On-Demand option 8214 of GUI 8110. By highlighting Look Back option 8212, a list of categories of available Look Back programs, denoted 8216, is displayed on the right side of GUI 8210. These categories include, e.g., TV show series, sports programming, specials, movies, kids programming and news.

Upon selecting Look Back option 8212 by pressing the select key on the remote control, Look Back Program Categories GUI 8220 is displayed. The available program categories 8216 are illustratively listed on the left side of GUI 8220. By highlighting a listed program category, a list of available programs, denoted 8224, is displayed on the right side of GUI 8220.

Upon selecting a program category by pressing the select key of the remote control, Look Back Programming GUI 8230 lists the programs 8224 that are available for the program category that was selected. These programs 8224 are illustratively listed on the left side of GUI 8230. As the user highlights a listed program, episodes 8234 that are available through the Look Back feature are listed on the right side of GUI 8230.

Upon selecting a program by pressing the select key on the remote control, Look Back Episode GUI 8240 lists, on the left side of GUI 8240, episodes 8234 that are available on the displayed On-Demand channel for the program that was selected. As the user highlights a listed episode, the reservation/play options 8244 that are available through the Look Back feature are listed on the right side of GUI 8240. These features may include, for example, canceling the Look Back feature request, playing the selected episode, reserving the selected episode, etc.

Figure 12:
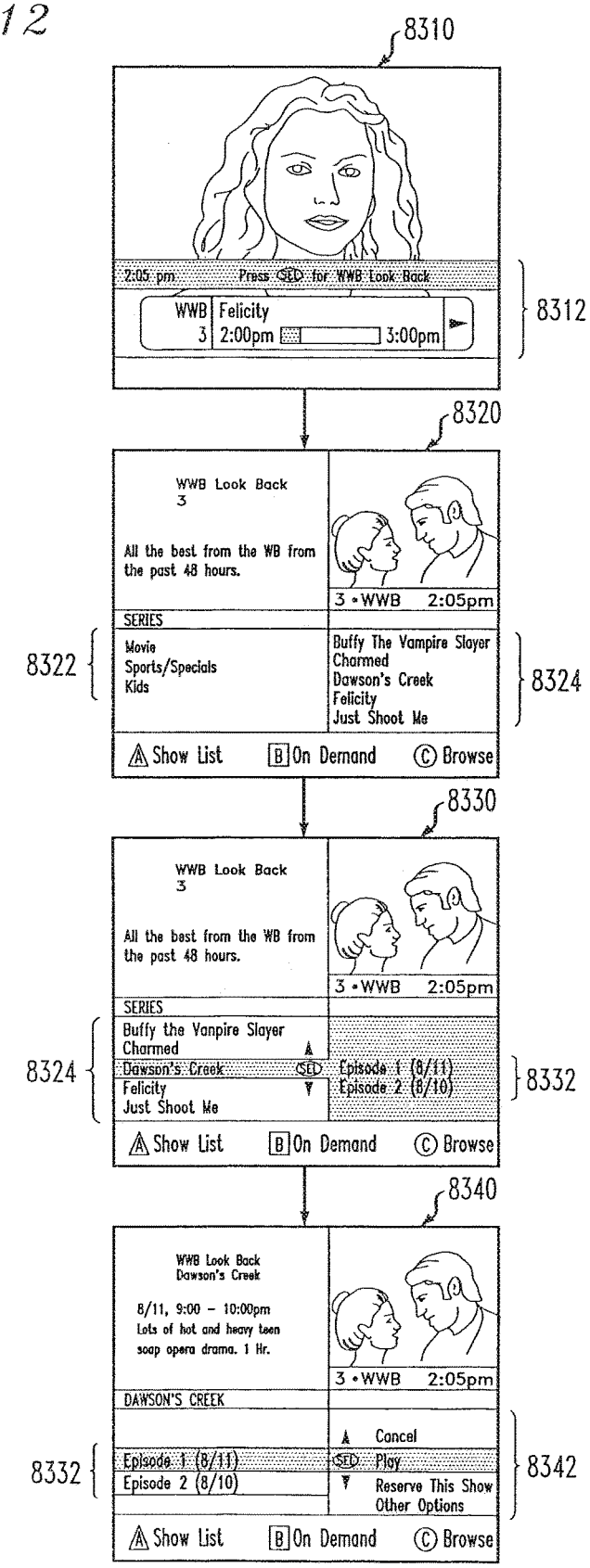
FIG. 12 illustrates screen displays in accessing a Look Back GUI in accordance with a third embodiment.

The Look Back feature may also be made available through an information banner, from which a show within the Look Back period could be selected for playing or reservation. Referring to FIG. 12, information banner 8332, illustratively in the form of a rectangular bar, contains information about a program that is being viewed by a user. The information banner may be displayed, e.g., when the user tunes to an NPVR enabled channel. The information includes the present time, the broadcast time (beginning and ending times), the channel on which the program is broadcast, etc. As indicated by GUI 8310, also provided by banner 8332 is a message indicating the availability of the Look Back feature for programming offered by the currently viewed channel.

By pressing the select key on the remote control, Look Back (program categories) GUI 8320 is displayed. The available program categories, denoted 8322, are illustratively listed on the left side of GUI 8320. By highlighting a listed program category, a list of available programs for such category, denoted 8324, is displayed on the right side of GUI 8320.

Upon selecting a program category by pressing the select key of the remote control, Look Back Programming GUI 8330 lists programs 8324 that are available for the program category that was selected. These programs 8324 are illustratively listed on the left side of GUI 8330. As the user highlights a listed program, episodes 8332 that are available through the Look Back feature are listed on the right side of GUI 8330.

Upon selecting a program by pressing the select key on the remote control, Look Back Episode GUI 8340 lists, on the left side of GUI 8340, episodes 8332 that are available for the selected program. As the user highlights a listed episode, reservation/play options 8344 that are available through the Look Back feature are illustratively listed on the right side of GUI 8340. These features may include, for example, canceling the Look Back feature request, playing the selected episode, reserving the selected episode, etc.

A First Embodiment of the Invention

The aforementioned channel and service tables in set-top terminal 900 are used to cross-reference program channel numbers with different television services (e.g., the broadcast and NPVR services) provided by system 100. In this illustrative embodiment, these tables are used by SAM 907 to invoke Watch TV application 903 and NPVR TV application 912 to realize the broadcast and NPVR services, respectively, which realization is transparent to a user.

Figure 13:
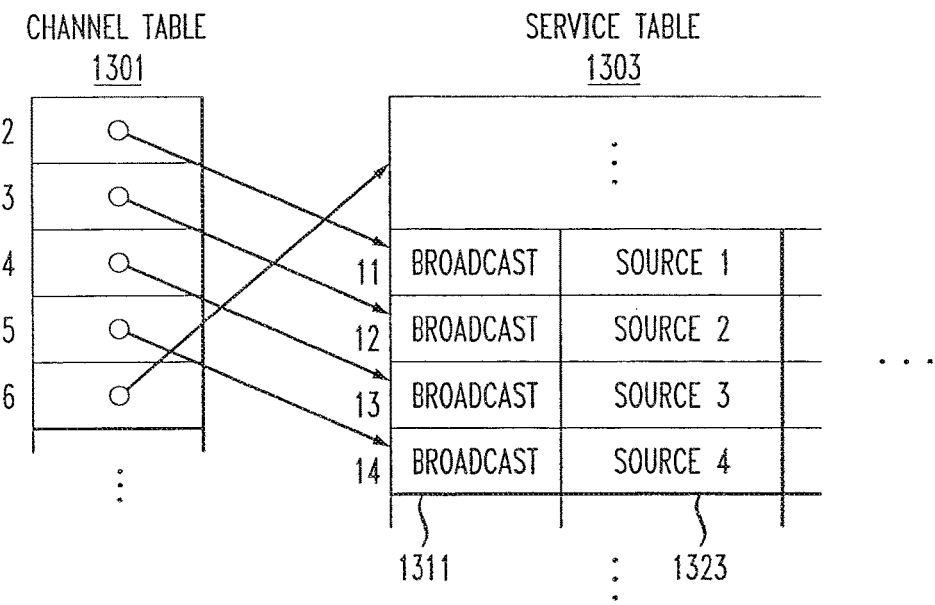
FIG. 13 illustrates prior art use of channel and service tables in a set-top terminal.

FIG. 13 illustrates prior art use of channel table 1301 to associate program channels with TV broadcast services listed in service table 1303. When a user selects a program channel, that program channel is first identified in channel table 1301 where a pointer associates the program channel with a particular TV broadcast service in service table 1303. For example, program channel 2 is associated with TV broadcast service 11; program channel 5 is associated with TV broadcast service 14; so on and so forth.

Service table 1303 indicates the type of service provided. In this example, as shown in column 1311, services 11-15 are TV broadcast services. Service table 1303 also provides in column 1323 data identifying sources of the listed TV broadcast services (e.g., TSIDs and PIDs). For example, by referring to service table 1303, a set-top terminal can execute appropriate software to realize a channel selection function. Specifically, when a user selects a new program channel, the set-top terminal identifies the type of service and the source associated with the selected channel from channel table 1301 and service table 1303, and then executes the appropriate application (e.g., Watch TV application 903) to tune to the service's source, descramble the signal if necessary, and display the source's content on the selected program channel.

As is also well known, requests for services made by different applications in a set-top terminal incorporate a uniform resource locator (URL), similar to that on the Internet, to uniformly identify services requested. Such a URL may include information regarding the format, physical location, logical location and identity of the service requested (e.g., format://physical/logical/identity).

Figure 14:
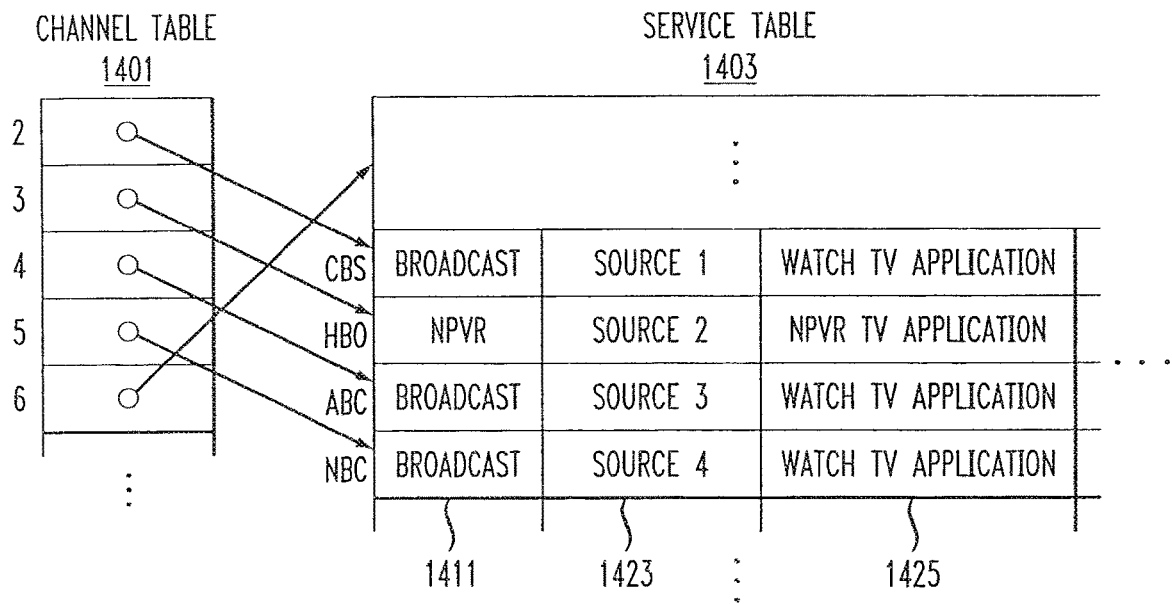
FIG. 14 illustrates use of channel and service tables in accordance with the invention.

As mentioned before, in accordance with the invention, selected program channels are afforded the NPVR functionality. Referring to FIG. 14, in this illustrative embodiment, the HBO service is the only service afforded the NPVR functionality. Accordingly, here, in Service Type column 1411 of service table 1403, the entry corresponding to the HBO service indicate an "NPVR" service while all other entries indicate a "broadcast" service. In addition, like service table 1303, service table 1403 specifies the sources to receive the corresponding services in column 1423. However, unlike table 1303 wherein each service is of broadcast service type and realized by Watch TV application 903 by default, table 1403 specifies in column 1425 the applications for realizing different services as they may be of broadcast or NPVR service type.

Specifically, as indicated in service table 1403, the application for realizing the HBO service of NPVR service type is NPVR TV application 912 while the application for realizing CBS, ABC and NBC services of broadcast service type is Watch TV application 903.

Figure 15:
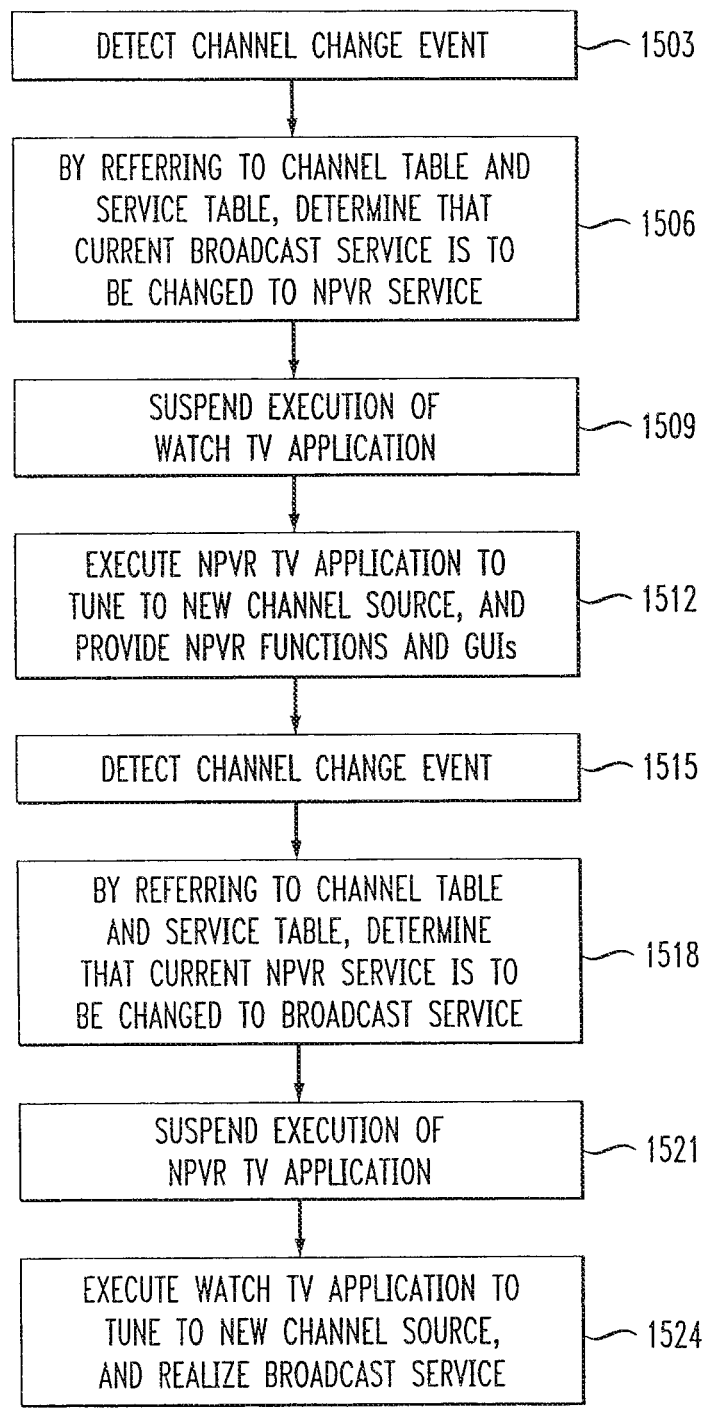
FIG. 15 is a flow chart depicting a first routine for providing broadcast and NPVR services in accordance with the invention.

Thus, for example, when a user changes from program channel 2 to channel 3, SAM 907 in a conventional manner detects the channel change event, as indicated at step 1503 in FIG. 15. At step 1506, by referring to channel table 1401 and service table 1403, SAM 907 determines that the current broadcast service on channel 2, realized using Watch TV application 903, is to be changed to an NPVR service on channel 3, realized using NPVR TV application 912. At step 1509, SAM 907 suspends the execution of Watch TV application 903, and at step 1512 executes NPVR TV application 912 to tune to the new program channel source, and provide the above-described NPVR functions and GUIs including, e.g., those of FIGS. 10-12 in response to a user's Look Back request. Application 912 remains active until a user changes from an NPVR service back to a broadcast service. Thus, when SAM 907 at step 1515 detects a program channel change event, say, from program channel 3 to program channel 5, by referring to channel table 1401 and service table 1403, SAM 907 at step 1518 determines that the current NPVR service on channel 3 is to be changed to a broadcast service on channel 5. At step 1521, SAM 907 suspends the execution of NPVR TV application 912, and at step 1524 executes Watch TV application 903 to tune to the new program channel source, and realize the broadcast service on channel 5. The above-described process repeats itself when a user changes to an NPVR enabled program channel.

A Second Embodiment of the Invention

Figure 16:
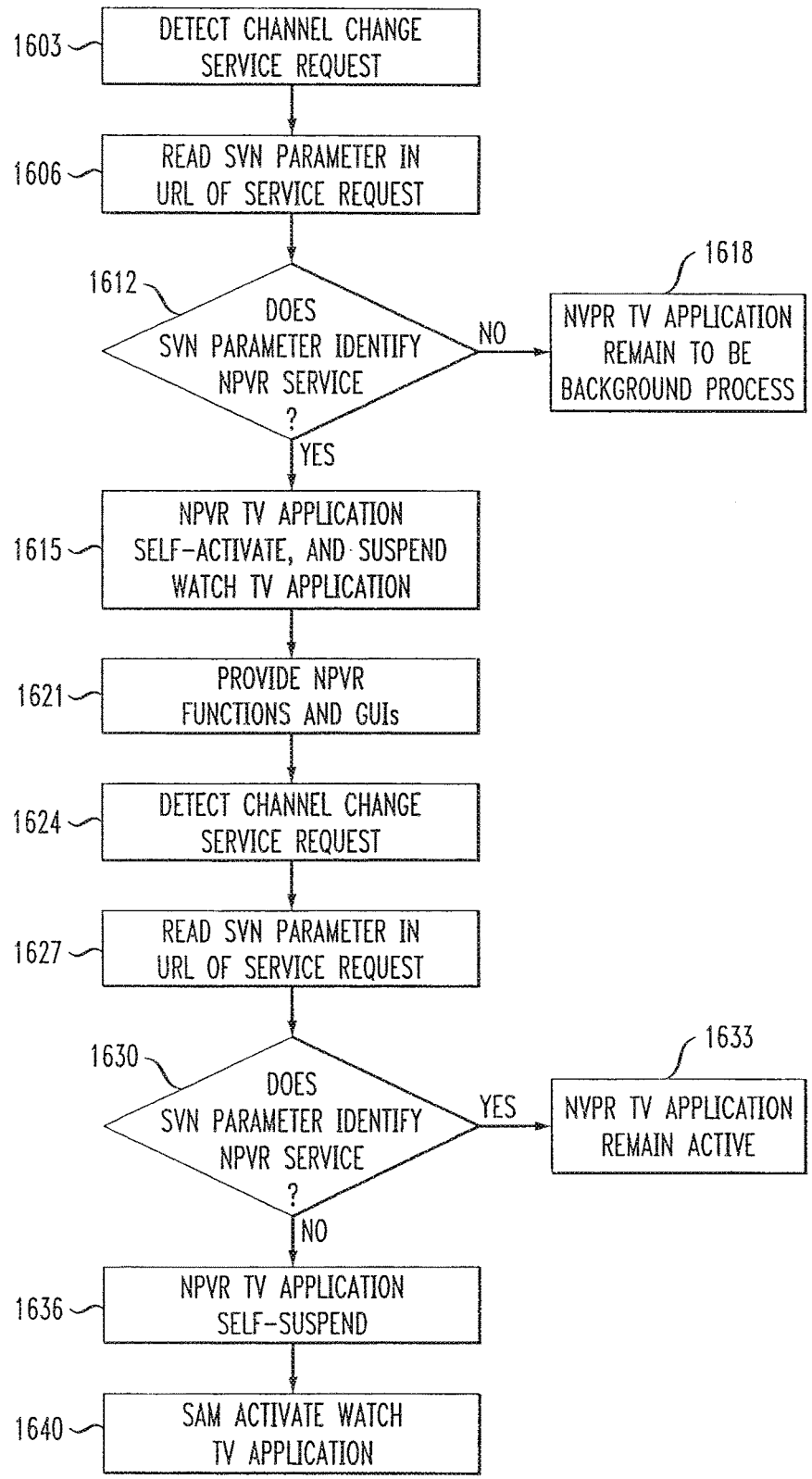
FIG. 16 is a flow chart depicting a second routine for providing broadcast and NPVR services in accordance with the invention.

In a second embodiment, NPVR TV application 912 is not mapped to any particular program channel using, e.g., a service table as in the first embodiment. Rather, application 912 is loaded on boot of set-top terminal 900, and continuously operates on terminal 900 as a background process. In this illustrative embodiment, application 912 snoops for a program channel change event realized by the aforementioned service request for changing channels. However, in accordance with an aspect of the invention, a service name (SVN) parameter (e.g., SVN=HBO) is added to the URL of one such service request, which is used to identify the service associated with the program channel to which it is changed. In addition, an SVN look-up table (not shown) is made available (e.g., in memory 910), which lists those SVNs, e.g., HBO, which are afforded the NPVR functionality. In this example, let's say while a user is watching program channel 2 associated with the CBS broadcast service, realized by Watch TV application 903, he/she changes to program channel 3 associated with the HBO service afforded the NPVR functionality. The user's channel change initiates a service request, which causes application 903 to tune to the new program channel source, i.e., channel 3 in this instance. Running in the background, NPVR TV application 912 detects the channel change service request, as indicated at step 1603 in FIG. 16. At step 1606, application 912 reads the SVN parameter in the URL of such a service request. By referring to the aforementioned SVN look-up table, application 912 at step 1612 determines whether the SVN parameter just read identifies a service afforded the NPVR functionality. If so, which is the case here, NPVR TV application 912 at step 1615 self-activates, and suspends the execution of Watch TV application 903. Otherwise, NPVR TV application 912 remains to be a background process, as indicated at step 1618.

At step 1621, application 912, when activated, provides the above-described NPVR functions and GUIs including, e.g., those of FIGS. 10-12 in response to a user's Look Back request. Application 912 remains active until a user changes from an NPVR service back to a broadcast service. Thus, when application 912 at step 1624 detects a service request for another program channel change, say, from program channel 3associated with the HBO service to program channel 5 associated with the NBC broadcast service, application 912 at step 1627 reads the SVN parameter in the URL of such a service request. By referring to the aforementioned SVN look-up table, application 912 at step 1630 determines whether the SVN parameter just read identifies a service afforded the NPVR functionality. If so, NPVR TV application 912 remains active, as indicated at step 1633. Otherwise, if the SVN parameter does not identify a service afforded the NPVR functionality, which is the case here, NPVR TV application 912 at step 1636 self-suspends its execution, thereby rendering control to SAM 907. At step 1640, SAM 907 activates Watch TV application 903 to tune to the new program channel source, and realize the broadcast service on channel 5. The above-described process repeats itself when a user changes to an NPVR enabled program channel.

A Third Embodiment of the Invention

Figure 17:
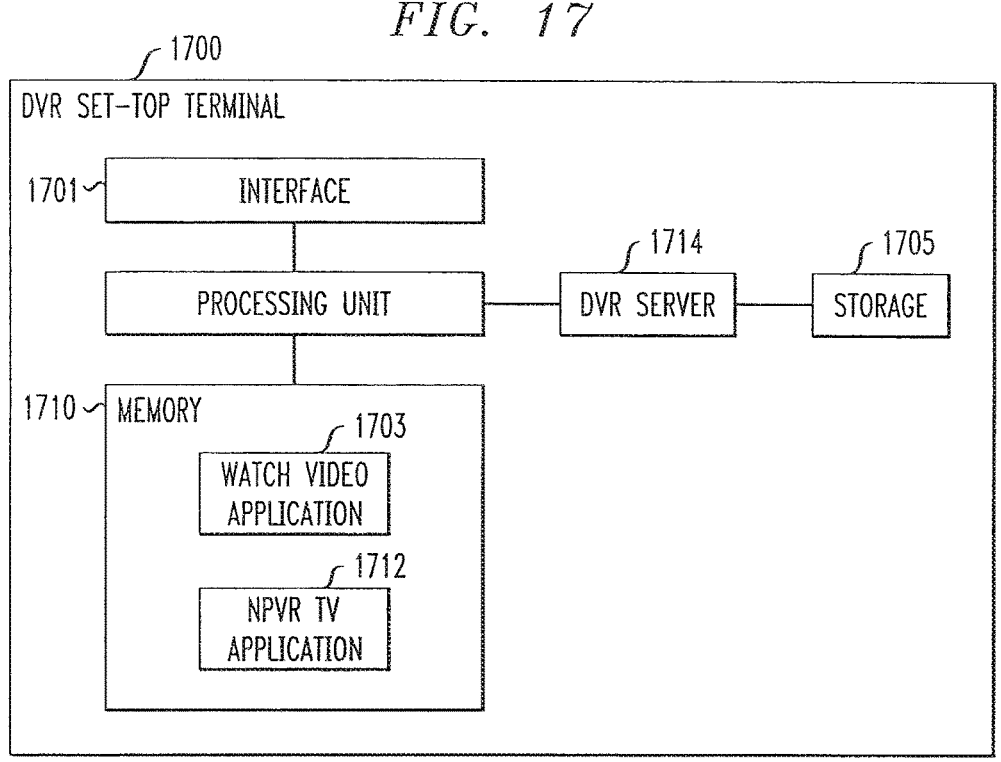
FIG. 17 is a block diagram of a DVR set-top terminal in accordance with the invention.

This third illustrative embodiment particularly applies where a DVR set-top terminal, denoted 1700 in FIG. 17, is used in lieu of set-top terminal 900. Like a prior art DVR set-top terminal, terminal 1700 has a conventional resident application, namely, "Watch Video" application 1703 installed therein. Like Watch TV application 903, Watch Video application 1703 is used to service those program channels afforded the traditional broadcast service. In addition, Watch Video application 1703 causes DVR server 1714 to perform well known DVR functions. In particular, in response to a trick mode command initiated by a user at DVR set-top terminal 1700, Watch Video application 1703 causes server 1714 to accordingly rewind, pause or fast-forward recorded broadcast programming content, stored in storage 1705 which may comprise a hard drive.

Like NPVR TV application 912, NPVR TV application 1712 here is downloaded to memory 1703 through interface 1701, and used to realize the NPVR service. Like memory 910, memory 1710 here comprises one or more caches, disks, hard drives, NVRAMs, DRAMs, Flash ROMs, and/or ROMs. In addition, application 1712 snoops for a program channel change event, realized by a channel change service request, similarly to application 912.

However, when NPVR application 1712 detects a program channel change event in which a broadcast channel is changed to an NPVR enabled channel, application 1712 may not take over Watch Video application 1703 immediately, especially if a user exercises only trick mode functions. In that case, when a user while watching the NPVR enabled channel initiates a trick mode command, say, a pause command, the trick mode command is not transmitted to, and processed by, remote media processor 119 as in the above-described NPVR service. Rather, Watch Video application 1703 causes local DVR server 1714 to process one such trick mode command as if it were a conventional DVR trick mode command. That is, Watch Video application 1703 affords the user the trick mode functions of manipulating the locally recorded programming content of the NPRV enabled channel.

In this example, let's say while a user at terminal 1700 is watching program channel 2 associated with the CBS broadcast service, realized by Watch Video application 1703, he/she changes to program channel 3 associated with the HBO service afforded the NPVR functionality. The user's change of the program channel initiates a service request, which causes application 1703 to tune to the new program channel source, i.e., channel 3 in this instance. Running in the background, NPVR TV application 1712 detects the channel change service request, as indicated at step 1803 in FIG. 18. At step 1806, application 1712 reads the SVN parameter in the URL of such a service request. By referring to the aforementioned SVN look-up table application 1712 at step 1812 determines whether the SVN parameter just read identifies a service afforded the NPVR functionality. If not, application 1712 remains to be a background process, as indicated at step 1815.

Otherwise, if it is determined that the SVN parameter identifies a service afforded the NPVR functionality, which is the case here, NPVR TV application 1712 at step 1818 readies itself to provide any PVR GUIs including, e.g., those of FIGS. 10-12 in case the user invokes the Look Back feature. In addition, Watch Video application 1703 remains active (also indicated at step 1818) even if the user exercises any trick mode functions (which are realized by application 1703 in the manner described before) or the user invokes NPVR GUIs provided by NPVR TV application 1712.

At the same time, NPVR application 1712 at step 1820 determines whether the user invokes any NPVR session setup event, e.g., establishing a Look Back session where the user is able to play back, say, an HBO program broadcast two days ago. If not, the subject routine returns to step 1818. Otherwise, the subject routine proceeds to step 1821 where NPVR TV application 1712 self-activates, and suspends the execution of Watch Video application 1703. At step 1824, application 1712, when activated, provides the NPVR functions including, e.g., the playback of the recorded programming content stored in headend 105 for the Look Back session, and trick mode functions realized using remote media processor 119. Application 1712 remains active until it detects that the NPVR session is over and torn down, as indicated at step 1827. At step 1830, application 1712 activates Watch Video application 1703, and reverts to its pre-session-setup state where it stands by to provide any NPVR GUIs upon user request.

When application 1712 at step 1833 detects a service request for another program channel change, say, from program channel 3 associated with the HBO service to program channel 5 associated with the NBC broadcast service, application 1712 at step 1836 reads the SVN parameter in the URL of such a service request. By referring to the aforementioned SVN look-up table. Application 1712 at step 1840 determines whether the SVN parameter just read identifies a service afforded the NPVR functionality. If so, the subject routine returns to step 1818. Otherwise, if the SVN parameter does not identify a service afforded the NPVR functionality, which is the case here, application 1712 at step 1846 becomes inactive. On the other hand, Watch Video application 1703, which is active, tunes to the new program channel source, and realizes the broadcast service on channel 5, as indicated at step 1850. The above-described process repeats itself when a user changes to an NPVR enabled program channel.

Modified NPVR Service

Figure 19:
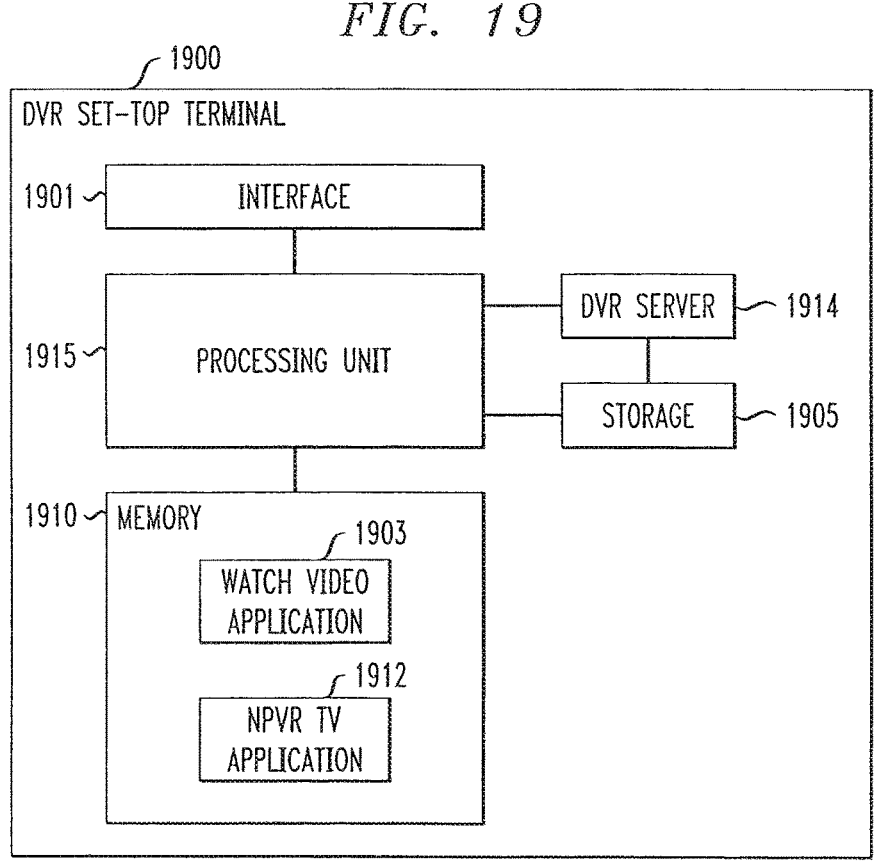
FIG. 19 is a block diagram of a second DVR set-top terminal in accordance with the invention.

The modified NPVR service in accordance with the invention particularly applies to a DVR set-top terminal, denoted 1900 in FIG. 19, which is similar to terminal 1700 previously described. In particular, terminal 1900 also includes conventional Watch Video application 1903 (identical to application 1703) as the resident application in memory 1910. Like memory 1710, memory 1910 here comprises one or more caches, disks, hard drives, NVRAMs, DRAMs, Flash ROMs, and/or ROMs.

The modified NPVR service principally relies upon DVR server 1914 to serve recorded programming content from storage 1905 and provide the trick mode functions even during an NPVR session, e.g., a Look Back session. During such a Look Back session, processing unit 1915, instructed by NPVR TV application 1912, receives a copy of the requested programming content from headend 105 through interface 1901 as in the above-described NPVR service. However, in accordance with the modified NPVR service, processing unit 1915 directs the received programming content to storage 1905 for buffering thereof before it is played back by DVR server 1914. DVR server 1914 when playing back the buffered programming content simply performs its conventional DVR functions, including any trick mode functions initiated by a user. Advantageously, the modified NPVR service obviates the need of otherwise communicating trick mode (pause, rewind and fast-forward) commands to remote media processor 119, which effects the corresponding trick mode functions as in the NPVR service, previously described with reference to FIGS. 6, 7 and 8. For that matter, in the modified NPVR service, no fast-forward or rewind trick files for each asset are created and maintained in headend 105, as in the previously described NPVR service, for effecting the corresponding fast-forward and rewind functions.

Figure 20:
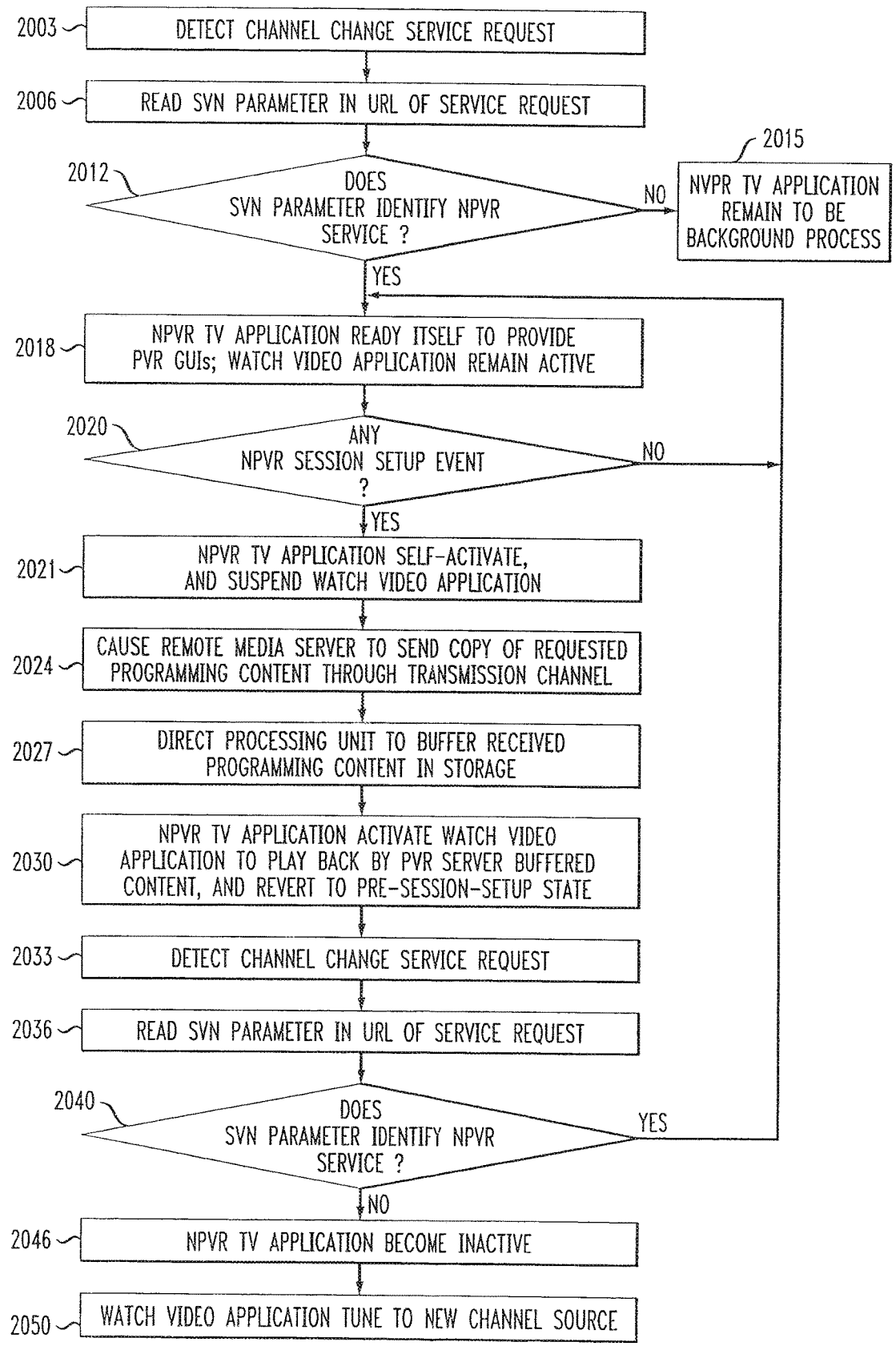
FIG. 20 is a flow chart depicting a routine for providing broadcast and modified NPVR services in accordance with the invention.

In this example, let's say while a user at terminal 1900 is watching program channel 2 associated with the CBS broadcast service, realized by Watch Video application 1903, he/she changes to program channel 3 associated with the HBO service afforded the NPVR functionality. The user's change of the program channel initiates a service request, which causes application 1903 to tune to the new program channel source, i.e., channel 3 in this instance. Running in the background, NPVR TV application 1912 detects the channel change service request, as indicated at step 2003 in FIG. 20. At step 2006, application 1912 reads the SVN parameter in the URL of such a service request. By referring to the aforementioned SVN look-up table, application 1912 at step 2012 determines whether the SVN parameter just read identifies a service afforded the NPVR functionality. If not, application 1912 remains to be a background process, as indicated at step 2015.

Otherwise, if it is determined that the SVN parameter identifies a service afforded the NPVR functionality, which is the case here, application 1912 at step 2018 readies itself to provide any PVR GUIs including, e.g., those of FIGS. 10-12 in case the user invokes the Look Back feature. In addition, Watch Video application 1903 remains active (also indicated at step 2018) even if the user exercises any trick mode functions (which are realized by application 1903 in the manner described before) or the user invokes NPVR GUIs provided by NPVR TV application 1912.

At the same time, NPVR application 1912 at step 2020 determines whether the user invokes any NPVR session setup event, e.g., establishing a Look Back session where the user is able to play back, say, an HBO program broadcast two days ago. If not, the subject routine returns to step 2018. Otherwise, the subject routine proceeds to step 2021 where application 1912 self-activates, and suspends the execution of Watch Video application 1903. At step 2024, application 1912, when activated, causes remote media processor 119 to send a copy of the requested programming content, e.g., the requested HBO program, through a transmission channel having, e.g., 6 MHz bandwidth to terminal 1900. At step 2027, application 1912 directs processing unit 1915 to buffer the received programming content in storage 1905. At step 2030, application 1912 activates Watch Video application 1903 to play back by DVR server 1914 the buffered content in storage 1905 to realize the Look Back feature, and application 1912 reverts to its pre-session-setup state where application 1912 stands by to provide any NPVR GUIs upon user request.

When application 1912 at step 2033 detects a service request for another program channel change, say, from program channel 3 associated with the HBO service to program channel 5 associated with the NBC broadcast service, application 1912 reads at step 2036 the SVN parameter in the URL of such a service request. By referring to the aforementioned SVN look-up table, application 1912 at step 2040 determines whether the SVN parameter just read identifies a service afforded the NPVR functionality. If so, the subject routine return to step 2018. Otherwise, if the SVN parameter does not identify a service afforded the NPVR functionality, which is the case here, application 1912 at step 2046 becomes inactive. On the other hand, Watch Video application 1903, which is active, tunes to the new program channel source, and realizes the broadcast service on channel 5, as indicated at step 2050. The above-described process repeats itself when a user changes to an NPVR enabled program channel.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the network transport is illustratively realized using HFC cable network 140. However, other networks such as digital subscriber line (DSL) networks, ethernet networks and satellite networks may be used instead.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for use in an apparatus for receiving programming content, the method comprising:
   realizing a first programming service by providing first programming content from a first programming source to a display device in accordance with a broadcast schedule, by a first software application;
   receiving a first request to change from the first programming source to a second programming source, the first request comprising an identifier of the second programming source; and
   if the identifier identifies a second programming source afforded a second programming service to provide second programming content after broadcast thereof, realizing the second programming service to provide second programming content to the display device after broadcast thereof, by a second software application, the second software application self-activating in response to the identifier in the first request, independent of the first software application, to become receptive to a second request for obtaining a selected portion of the second programming content.

2. The method of claim 1, wherein receiving the first request comprises:
   receiving a channel change request to change from the first channel to a second channel afforded the second programming service.

3. The method of claim 2, comprising:
   determining, by the second software application, independent of the first software application, whether the second channel is afforded the second programming service; and
   self-activating if the second channel is afforded the second programming service.

4. The method of claim 1, further comprising:
   suspending execution of the first software application, by the second software application, after self-activation.

5. The method of claim 1, further comprising:
   monitoring for the first change request by the second software application independent of the first software application, while the second software application is running in the background.

6. The method of claim 1, further comprising:
   receiving the second request after self-activating; and
   after self-activating, providing on the display device a user interface for selecting the selected portion of the second programming content, by the second software application, to respond to the request.

7. The method of claim 1, further comprising:
   accessing the second programming source by the first software application in response to the first request.

8. The method of claim 1, further comprising:
   registering the first software application in a registry of software applications; and
   registering the second software application in the registry separate from the first software application.

9. The method of claim 1, further comprising:
   receiving the second request;
   providing the second programming content via the second software application;

receiving a third request to manipulate the presentation of the second programming content; and
causing manipulation of the presentation of the second programming content by the second software application, based on the third request.

10. The method of claim 1, further comprising:
providing on the display device, a user interface for selecting a selected portion of the second programming content, after receiving the second request, via the second software application.

11. The method of claim 10, wherein: the selected portion was broadcast within a predetermined period in the past at a location remote from the apparatus.

12. The method of claim 11, further comprising:
obtaining the selected portion from the remote location through a communications network, via the second software application, in response to the second request.

13. A method for use in an apparatus for receiving programming content, the method comprising:
realizing a first programming service by providing first programming content from a first programming source to a display device in accordance with a broadcast schedule, by a first software application;
receiving a first request to change from the first programming source to a second programming source providing second programming content in accordance with the broadcast schedule, wherein the second programming source is further afforded a second programming service to provide third programming content after broadcast thereof;
accessing the second programming source by the first software application, in response to the first request, to provide to the display device the second programming content in accordance with a broadcast schedule;
receiving a second request to receive second programming content after broadcast thereof, in accordance with the second programming service; and
realizing the second programming service to provide to the display device the second programming content after broadcast thereof, by a second software application, the second software application self-activating in response to the second request, independent of the first software application, to become receptive to a third request for obtaining a selected portion of the second programming content.

14. The method of claim 13, wherein the apparatus comprises a server, the method comprising:
storing first programming content received from the first programming source, by the server; and
providing the stored first programming content to the display device, by the server, by the first software application.

15. The method of claim 14, further comprising:
receiving a fourth request to manipulate programming content from the second programming source; and
manipulating the programming content provided by the server, by the first software application.

16. The method of claim 13, comprising becoming receptive to the third request by:
displaying a user interface on the display device for receipt of the third request.

17. The method of claim 13, further comprising:
registering the first software application in a registry of software applications; and
registering the second software application in the registry separate from the first software application.

18. The method of claim 13, wherein:
the selected portion was broadcast within a predetermined period in the past; and
the selected portion was recorded during broadcast at a location remote from the apparatus.

19. An apparatus for receiving programming content, comprising:
a memory storing a first software application and a second software application; and
a processor configured to:
realize a first programming service to provide first programming content in accordance with a broadcast schedule to a display device, under the control of the first software application;
realize a second programming service to provide second programming content to the display device after broadcast thereof, under the control of the second software application; and
receive a first request to change from a first programming source afforded the first programming service to a second programming source, the first request comprising an identifier of the second programming source;
wherein if the identifier in the first request is indicative of a second programming source afforded a second programming service to provide second programming content after broadcast thereof, the second software application self-activates to become receptive to a second request to obtain a selected portion of the second programming content, independent of the first software application.

20. The apparatus of claim 19, wherein:
the memory defines a registry of software applications; and
the first and second software applications are registered separately in the registry.

21. The apparatus of claim 19, wherein the second programming source is accessed via the first software application before the state of the first software application is changed to the off state.

22. The apparatus of claim 19, wherein the processor is further configured to provide a user interface for selecting the selected portion of the second programming content, after receiving the second request, via the second software application.

23. The apparatus of claim 19, wherein the selected portion was broadcast within a predetermined period in the past and recorded during the broadcast thereof at a remote location, the processor being further configured to:
obtain the selected portion from the remote location through a communications network, via the second software application, after receiving the second request.

24. The apparatus according to claim 19, comprising a set-top terminal.

25. An apparatus for receiving program content, the apparatus comprising:
memory storing a first software application and a second software application; and
at least one processor configured to:
realize a first programming service to provide first programming content in accordance with a broadcast schedule to a display device, under the control of the first software application;
realize a second programming service to provide second programming content to the display device after broadcast thereof, under the control of the second software application;

receive a first request to change from a first programming source afforded the first programming service to a second programming source afforded the second programming service;

access the second programming source by the first software application, in response to the first request, independent of the second software application, to provide the second programming content in accordance with the broadcast schedule;

receive a second request for obtaining a selected portion of the second programming content after broadcast thereof in accordance with the second programming service; and realize the second programming service to provide the second programming content after broadcast thereof to the display device, by the second software application.

26. The apparatus of claim 25, wherein the memory defines a registry of software applications, and the first and second software applications are registered separately in the registry.

27. The apparatus of claim 25, further comprising:
storage to store received first programming content; and
a server configured to present the stored first program content to the display device, under the control of the first application.

28. The apparatus of claim 27, wherein the processor is further configured to cause the server to manipulate a presentation of the stored first programming content under the control of the first software application in response to a third request to manipulate presentation of first programming content.

29. The apparatus of claim 27, wherein the processor is further configured to cause manipulation of presentation of the selected portion of the second programming content, under the control of the second software application, in response to a third request to manipulate second programming content.

30. The apparatus of claim 27, wherein the second programming content is recorded during the broadcast thereof at a location remote from the apparatus, within a predetermined period in the past;
the processor being configured to:
receive the second request;
obtain the selected portion of the second programming content from the remote location through a communications network via the second application, in response to the second request;
store the obtained selected portion in the storage; and
cause the server to present the stored selected portion to the display device via the first software application.

31. The apparatus of claim 25, comprising a set-top terminal.

* * * * *